United States Patent [19]
Ramachandran et al.

[11] Patent Number: 6,067,604
[45] Date of Patent: May 23, 2000

[54] SPACE-TIME MEMORY

[75] Inventors: Umakishore Ramachandran, West Newton; Robert H. Halstead, Jr., Belmont; Christopher F. Joerg, Watertown; Leonidas Kontothanassis, Belmont; Rishiyur S. Nikhil; James M. Rehg, both of Arlington, all of Mass.

[73] Assignee: Compaq Computer Corporation, Houston, Tex.

[21] Appl. No.: 08/909,405

[22] Filed: Aug. 11, 1997

[51] Int. Cl.[7] ..................................................... G06F 12/02
[52] U.S. Cl. ..................... 711/149; 711/173; 711/153; 707/206; 709/400; 713/502; 713/600
[58] Field of Search ..................................... 711/149, 169, 711/218, 129, 131, 150, 153, 168, 173; 707/206; 709/400; 713/600, 502; 345/28, 190, 193

[56] References Cited

U.S. PATENT DOCUMENTS

| | | | |
|---|---|---|---|
| 5,691,902 | 11/1997 | Taniguchi et al. | 701/119 |
| 5,713,039 | 1/1998 | Tran | 395/800 |
| 5,802,580 | 9/1998 | McAlpine | 711/149 |
| 5,852,449 | 12/1998 | Esslinger et al. | 345/473 |

OTHER PUBLICATIONS

Jefferson, D., "Virtual Time, " Univ. of So. Calif., ACM Transactions on Programming Languages and Systems, vol. 7, No. 3, Jul. 1985, pp. 404–425.

Fujimoto, R., "The Virtual Time Machine," Univ. of Utah, Symp. On Parallel Algorithms and Architecture, 1989.

Ghosh et al., "Parallel Discrete Event Simulation Using Space–Time Memory," Georgia Inst. Of Tech., Mar. 6, 1995, appeared in International Conf. On Parallel Processing, 1991.

Singla et al., "Temporal Notions of Synchronization and Consistency in Beehive," Georgia Inst. Of Tech., to appear in SPAA'97.

*Primary Examiner*—Heip T Nguyen
*Attorney, Agent, or Firm*—Cesari and McKenna, LLP

[57] ABSTRACT

In a computer system, a memory is allocated to a plurality of ports. The ports are arranged in a spatial ordering. A plurality of various sized data items are temporally ordered in each of the plurality of ports. Each data item includes a time-stamp to indicate the temporal ordering of the plurality of data items. The plurality of data items are atomically accessed by a plurality of threads using space and time coordinates. The space and time coordinates uniquely identify each of the plurality of data items.

16 Claims, 8 Drawing Sheets

SPACE-TIME MEMORY

FIELD OF THE INVENTION

This invention relates generally to computer systems, and more particularly to shared memories used with parallel computer systems.

BACKGROUND OF THE INVENTION

In the past, parallel computer systems have extensively been used to solve complex computational problems in less time. In parallel computer systems, a complex problem is partitioned into multiple smaller parts that can be attacked simultaneously. For example, a loosely coupled network of readily available low-cost computers were recently able to factor a 167 digit prime number in a matter of days. This was a task that many experts in the past said might take years to solve using traditional systems and methods.

Currently, there are a number of different efforts in progress to apply parallel computing techniques to complex real-time applications such as speech processing, robotics, and computer vision. On the hardware side, a broad variety of parallel architectures have been explored. Representative commercial systems include SIMD machines such as CM-2 and MasPar and systolic/data-flow machines such as the iWarp system. Experimental parallel computers include pyramid architectures such as the IUA and reconfigurable machines such as PASM and Proteus.

Each of these parallel architectures represents a particular viewpoint on the diverse requirements of parallel computing in, for example, automated vision systems. SIMD and data-flow architectures typically target low-level automated vision tasks such as histogramming, image smoothing, and convolution. Pyramid machines implement a hierarchical decomposition of vision problems in hardware. Reconfigurable machines explore the dynamic configuration of processing resources between low and high level vision tasks.

Today, commercial MIMD computers such as the Digital Equipment Corporation AlphaServer 4100, Silicon Graphics Origin 2000, and IBM SP-2 have become commonplace. These machines support task parallelism in which an application is divided into multiple interacting processes, or threads, which perform distinct tasks. Systems with four to eight processors are common and some can scale to hundreds of processors.

It is proposed that commercial MIMD offerings will continue to provide the most cost-effective path to increasing performance. Therefore, the question of how to best use these machines for complex computational tasks such as computer vision, which require synchronized processing of temporally ordered data, e.g., digitized frames of a video sequence, is addressed here.

Commercial MIMD computers promise cost-effective parallel processing for interactive vision applications, but programming MIMD computers is time-consuming and obtaining good performance is often difficult. Two major sources of difficulty are the synchronization and buffer management tasks required by the characteristic data flow in, for example, a vision application.

One prior art parallel technique, the Beehive system developed at the Georgia Institute of Technology, provides a software distributed shared memory system for transparent access to shared data in a cluster of Sun workstations. The application programming interface (API) of Beehive provides shared memory programming with synchronization primitives that have temporal correctness guarantees.

Beehive is particularly well-suited for applications that tolerate a certain amount of staleness in the global state information. Beehive has been used for real-time computation of computer graphical simulations of animated figures. As limitations, Beehive does not support variable access granularities for different data items manipulated by the application, nor does Beehive provide a multi-dimensional addressing capability, for example, in space and time. Moreover, Beehive does not provide atomicity for reading and writing variable sized data items.

The idea of a temporally ordered memory has also been used in optimistic distributed discrete-event simulation. In those systems, a space-time memory allows an application to "roll-back" to an earlier state when data items are received out of temporal order.

The processes used in complex real-time interactive applications, such as vision oriented user-interfaces, or robotics, typically follow a data flow model in which images acquired by digitizers go through several stages of processing, resulting in a control signal or some other output.

In a typical vision application, multiple moving objects are tracked in a scene. Frames of the video are compared with immediately previous frames to determine a moving region. Color histogram analysis of moving regions yield possible target locations. The peak location in the histogram corresponds to the object. This location is used to control the gaze direction of a displayed synthetic graphical agent. For this type of application, the speed and latency of the vision component of the system has a direct impact on its overall effectiveness. Parallel computing is necessary to meet the demanding computational and bandwidth requirements of vision algorithms and achieve high performance.

It is desired to provide parallel processing for a target architecture which includes a cluster of symmetric multi-processors (SMP's) connected together through a network. The parallel processing is to take place on data stored in shared memories of the SMP. It is also desired that the data can be addressed in multiple dimensions.

SUMMARY OF THE INVENTION

Provided is a method for accessing shared data stored in a memory of a computer system. The memory is allocated to a plurality of ports arranged in a spatial ordering. A plurality of various sized data items are ordered in each of the plurality of ports. Each data item includes an index to indicate the ordering of the plurality of data items. In one aspect of the invention, the ordering is temporal, and the index is a time stamp.

A plurality of threads atomically access the plurality of data items using space and time coordinates. Accesses include reading and writing data items on port connections. Space coordinates identify ports, and time coordinates index data items within ports so that the coordinates uniquely identify each of the plurality of data items.

Each thread has an associated virtual time value that represents where the thread is in relation to its computations. Each thread also has an associated virtual time window for defining valid time-stamp values that can be associated with data items produced by the thread. Using the thread virtual times, and the time-stamp values of unconsumed items on all ports, the system determines a global virtual time. Items with time-stamp values before this global virtual time can be garbage collected. Furthermore, the current virtual time of a thread can be synchronized with real (wall-clock) time, and a relationship can be defined between a virtual time tick and an interval of real time.

In one aspect, a sub-set of the data items are digitized frames of a video stream, and the plurality of threads include a digitizer thread, a histogrammer thread, and a back-project thread which accesses ports storing data items as the digitized frames, motion masks, and models.

DETAILED DESCRIPTION OF PREFERRED EMBODIMENTS

Figure 1:
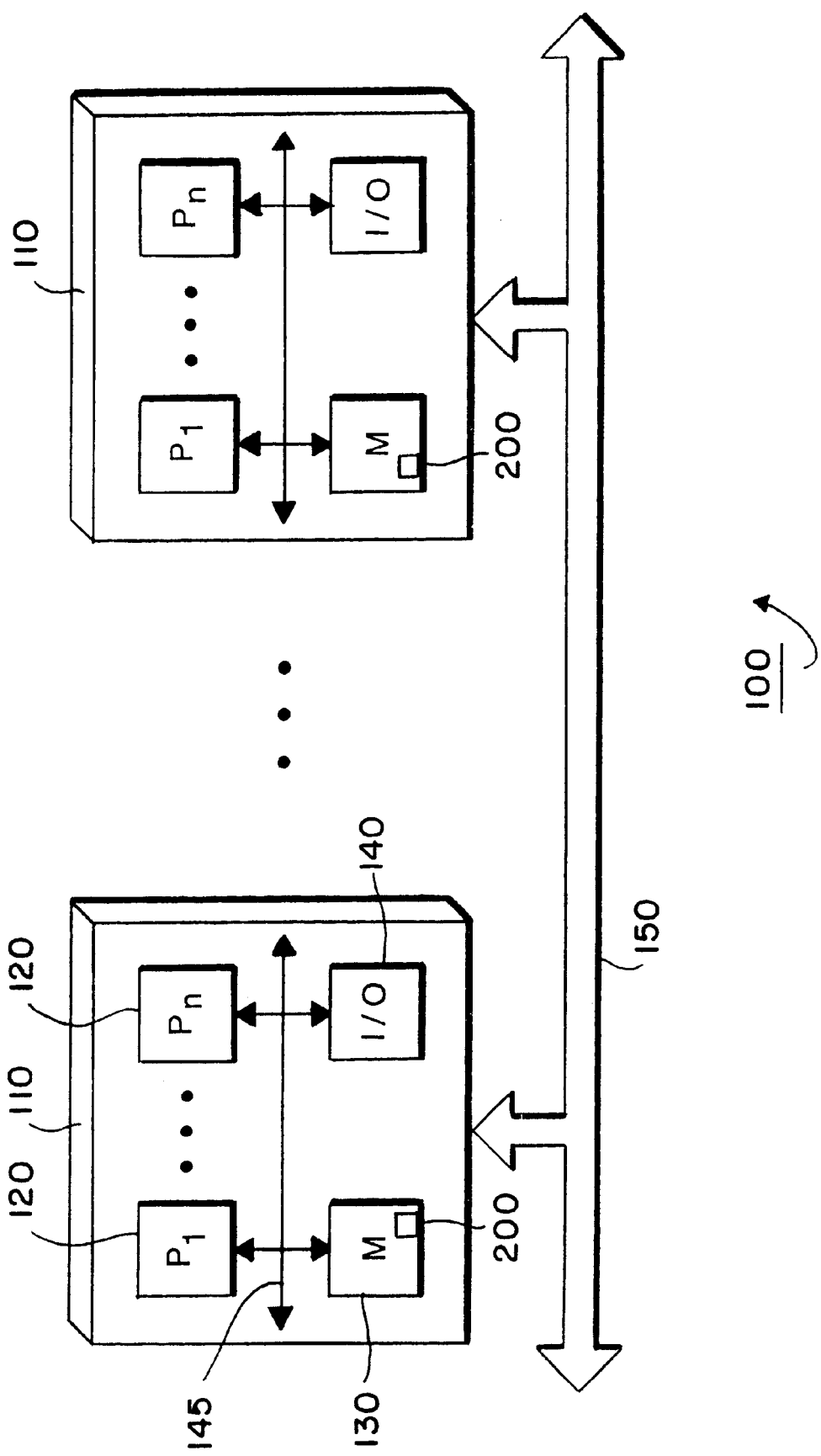
FIG. 1 is a block diagram of a cluster of computers including a space-time memory according to the invention.

FIG. 1 shows a cluster 100 of symmetric multi-processors (SMP) 110 arranged to use a space-time memory according to the invention. Each SMP 110 includes a plurality of processors (P1, . . . , PN) 120, memories 130, and input/output interfaces (1/0) 140 connected to each other by a bus 145. The SMPs 110 are connected to each other by a high-speed communications channel 150.

In one embodiment, the SMPs 110 are Digital Equipment Corporation AlphaServer 4100 computers executing application programs written in the C language using the Unix operating system. Other languages and operating systems can also be used. Each SMP 110 typically includes four to eight processors. The invention can also be used on clusters built from SMP nodes containing any number of processors. The invention can even be used on clusters of non-SMP machines such as personal computers and workstations.

Each SMP 110 is capable of concurrently executing multiple application threads. A "thread" is a sequence of related machine instructions connected in their execution. While executing, the instructions of the threads, and data manipulated by the instructions are stored in the memories 130.

The memories 130 can be arranged as a distributed shared memory (DSM). With a DSM, applications can access common data stored in multiple distinct physical memories as a single coherent logical structure. Shared data and coherency control information is communicated between the SMPs 110 via the channel 150.

Space-Time Memory

Figure 2:
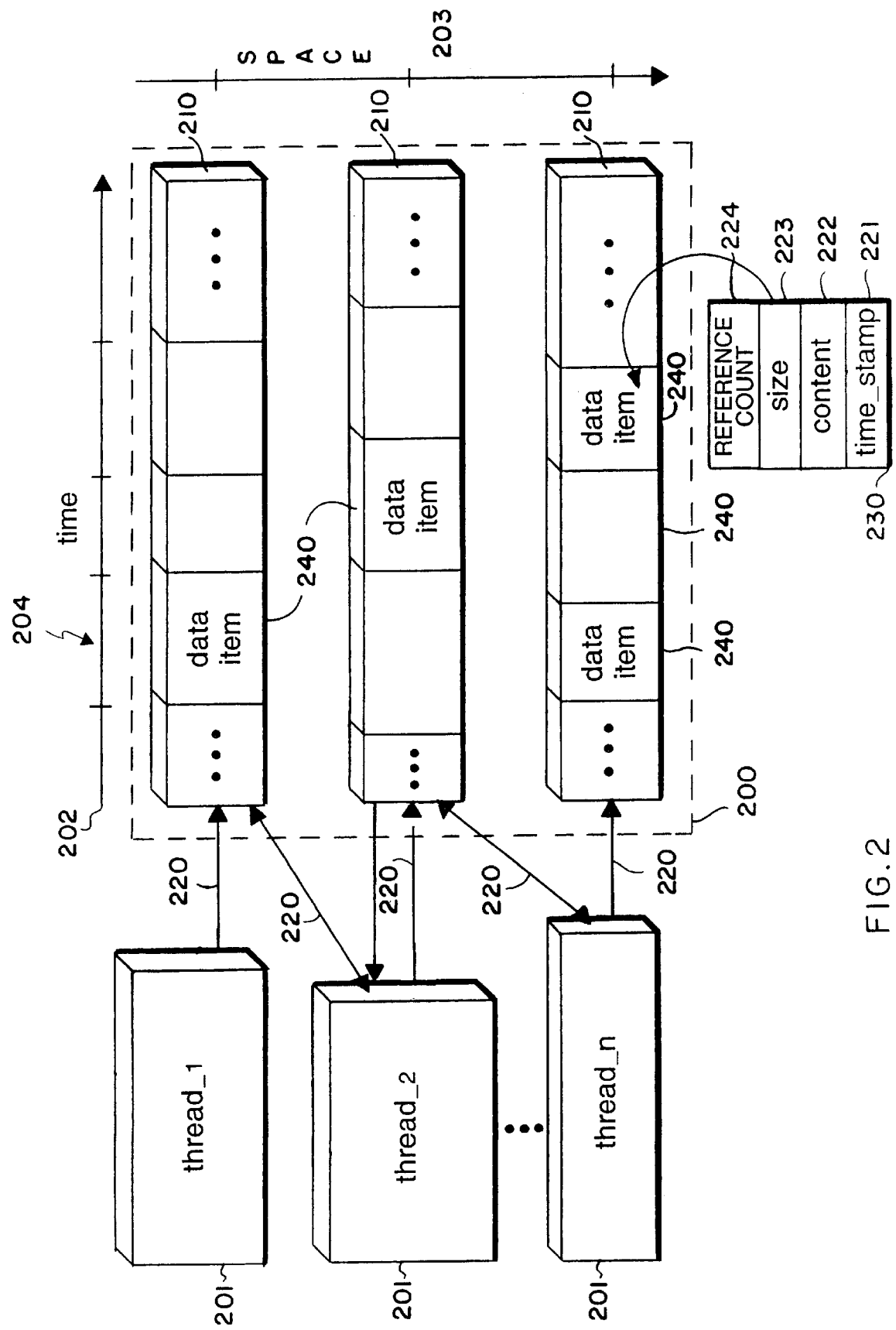
FIG. 2 is a block diagram of the space-time memory including a plurality of ports.

FIG. 2 shows multiple execution threads (thread_1 thread_2, and thread_n) 201 accessing a space-time memory 200 arranged according to the invention. The accesses are performed via connections 220. As shown, the space-time memory (STM) 200 is a dynamic, two-dimensional data structure which allows the threads 201 to access shared data in parallel. Because the memory is two-dimensional, data are accessed by both a space coordinate and a time coordinate. This is in contrast with traditional memories where data are generally accessed only by their spatial memory locations.

In the STM 200 as depicted, a time dimension 202 runs from left to right, and a space dimension 203 runs from top to bottom. The units along the space and time dimensions are designed to provide access to the data at convenient levels of granularity.

The programmer can think of the STM 200 as extending infinitely along the time axis 202, which is marked off in discrete time units 204. Every data item produced by a thread has an associated virtual time value or "time" coordinate.

A thread can propagate the virtual time coordinate from an item it reads to an item it writes. Items can be read from one port and written to another. For example, in an interactive vision system, the application might use the frame number of a digitized video as the virtual time coordinates of items. Virtual time can be thought of as an application-specified unit of elapsed execution time, and represents the progress of individual threads in the overall application.

Because the threads process data at different rates, the STM will be sparse in the temporal dimension 202. The STM performs garbage collection to meet the constraints of finite memory. Thus at any instant, the STM contains only the temporal snapshot of the data items that the threads of the application are capable of accessing.

Ports

The unit (coordinate) of access along the space dimension 203 is a port 210. The space-time memory 200 can include a plurality of ports 210. Each port 210 is a temporally evolving data structure manipulated by the threads 201. The association between the threads 201 and the ports 210 are the connections 220.

Threads 201 may read and write data on multiple ports 210, and each port 210 can be read from and written to by multiple threads 201. A connection which is used for writing data is known as an output connection, and a connection which is used for reading data is called an input connection. The number of ports 210 in the STM 200 corresponds to the number of distinct sequences of data that are being manipulated by the application threads. This number can grow and shrink dynamically as the state of the application changes.

Virtual Time Ticks

The unit (coordinate) of access along the time dimension 202 in the STM 200 is a virtual time tick 204. Time ticks can be related to intervals of real time. After a thread uses an input connection to read a data item, the thread can mark the item as consumed with respect to that input connection. Marking a data item as consumed is a key step in enabling the data item to be garbage collected.

Data Item

A data item 240 in the STM 200 is a sequence of bytes addressed by the (port, virtual time tick) coordinate. The STM 200 guarantees atomic read and write operations on a data item, e.g., a data item is written in its entirety before the item is available for a subsequent read operation. Attributes 230 of data items include: a time-stamp value 221, content 222, size 223, and an optional reference count 224. After a data item is generated, it usually remains unchanged, although the invention does also work with changeable data items.

Time-stamp

The time-stamp value 221 is used to specify the virtual time tick (temporal) coordinate of a data item (the port being the spatial coordinate). Therefore, each item in the STM 200 is uniquely identified by a port/time-stamp pair. Time-stamps 221 can be inherited to represent data dependencies. Logically, one can think of the STM 200 as extending infinitely along the time dimension 202, although the preferred embodiment implements garbage collection to meet the constraints of finite physical memory.

Content

The content of the item is defined by the application threads. The STM 200 does not perform any operations on the content of data items.

Size

Data items can be any arbitrary size. The size attribute is used for memory allocation and deallocation.

Reference Count

If a reference count is specified, then the STM will garbage collect the item when the item is marked as consumed on different connections the number of times as specified in the reference count.

Virtual Time Concept

Virtual time is the concept by which the application threads 201 determine the time-stamp values 221 of the data items of the STM 200. Virtual time can be thought of as an application-specified unit of elapsed execution time. Virtual time represents the progress of individual threads in the overall application. In practice, threads may process data at different rates. This means that the STM 200 is sparse in the temporal dimension. For example, if thread_1 executes much faster than thread_2 and thread_3, then the latter two threads may produce fewer data items 240. In other words, there does not need to be a data item for every virtual time tick in each port.

The concept of virtual time provides a powerful abstraction of the usual notion of real time in which a process executes. Dependencies between data produced by different threads at different rates can simply be expressed through the inheritance of time-stamps. The temporal correctness of data is guaranteed by a set of rules for reading and writing time-stamped data. Moreover, synchronization to real time is preserved in the framework through the ability to specify and enforce a particular execution period for a thread.

For example in a vision application, thread_1 can periodically generate a data item, e.g., a frame of pixels, every thirty milliseconds (ms). A thread which completes processing a particular data item before its execution period has ended can be suspended, and a thread that exceeds its execution period can generate a warning which can be handled at the discretion of the application.

Time-Stamp Generation and Inheritance

Figure 3:
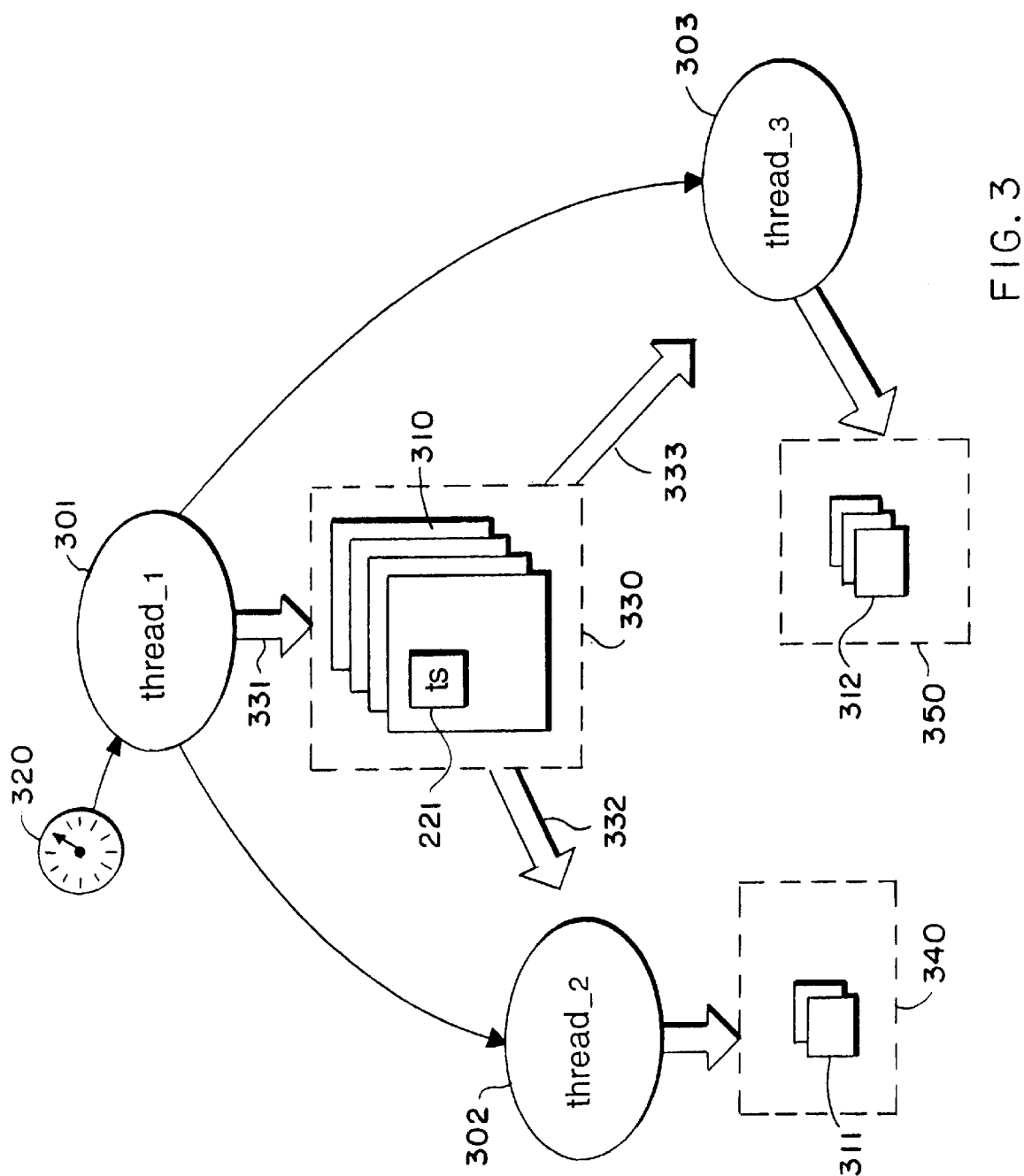
FIG. 3 is a flow diagram of multiple threads sharing data of the space-time memory of FIG. 1.

As shown in FIG. 3, the space-time memory 200 supports two mechanisms for producing time-stamps: generation and inheritance. For example, thread_1 301 can generate time-stamps 221 for a sequence of data items 310 by referencing a local counter 320. For example, a new data item 310 could be generated every 30 ms. The items 310 are written to a port 330 via an output connection 331.

Thread_1 301 is a parent thread which can spawn child threads 302 and 303. Threads 302–303 use the data items 310 generated by thread_1 301 by reading port 330 via input connections 332 and 333. Therefore, thread_2 302 and thread_3 303 inherit the time-stamps 221 from port 330 where thread_1 301 wrote the items 310. Modified items 311–312 can be written to ports 340 and 350 connected respectively to thread_2 and thread_3. Threads no longer needed can be terminated at will.

Virtual Time Window

Figure 4:
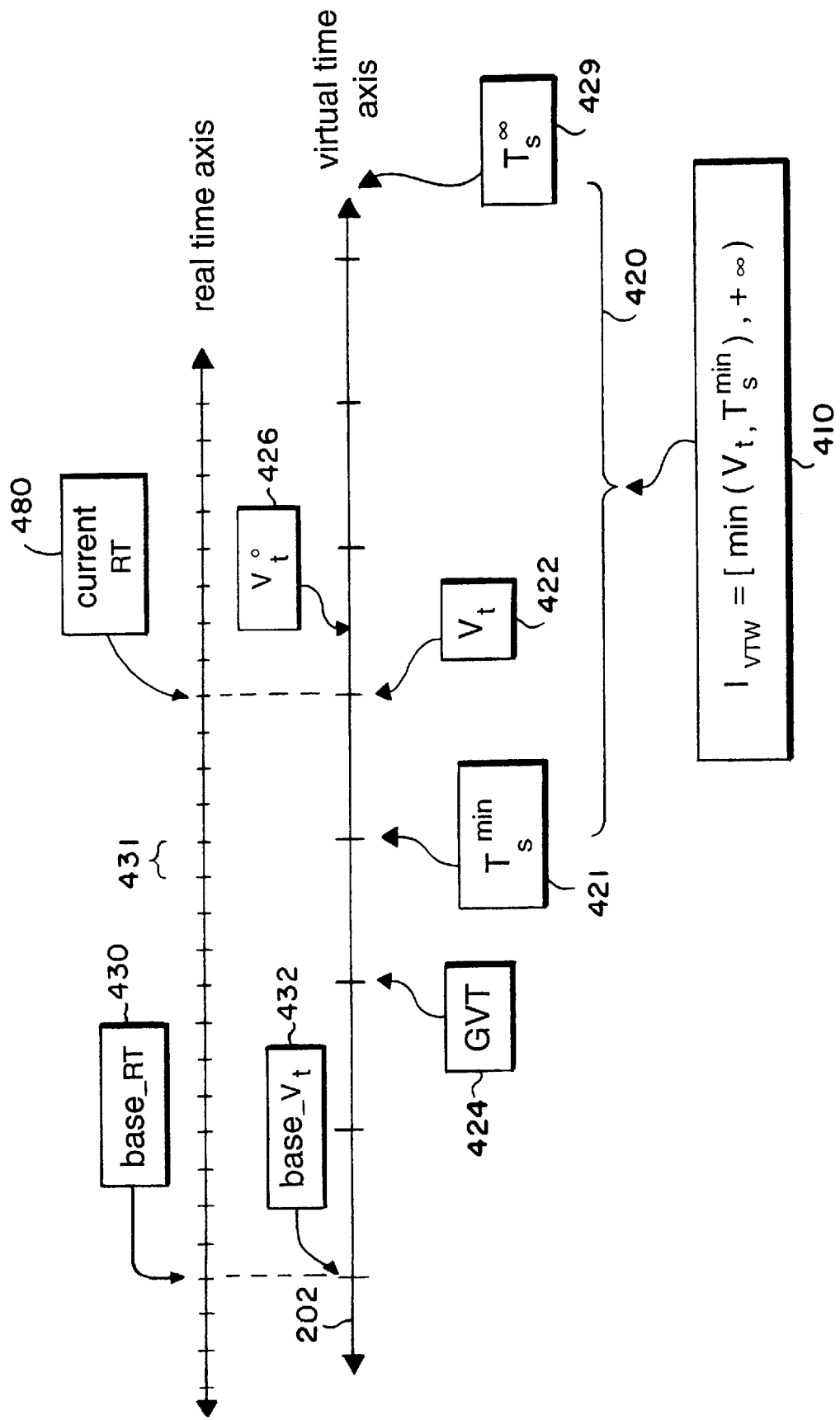
FIG. 4 is a timing diagram of real and virtual times.

As shown in FIG. 4, the concept of time-stamp coordinates along the virtual time dimension 202 provides a convenient method for referencing data items of ports accessed by the threads. While a thread accesses items, a basic correctness requirement is that the time-stamps must come from a legal set.

A thread-specific virtual time window ($I_{VTW}$) is defined as a set $[\min(V_T, T^{min}_s), +\infty]$ 410. This set can be visualized as an interval 420 along the virtual time axis 202. The upper bound 429 of the interval 420 is $+\infty$ because threads can skip forward an arbitrary amount of time into the future. A lower bound 421 which is sufficient for many threads is $T^{min}_s$. $T^{min}_s$ defines the data item with the smallest time-stamp that the thread has read but not consumed on any of its input connections.

A thread marks a data item as "consumed" when the thread no longer needs the data item. For example, after a thread has read a data item it can be marked as consumed. Marking an item as consumed makes the item eligible for garbage collection. Successive consumes will cause the lower bound 421 of the VTW interval 420 to advance, making garbage collection feasible.

Virtual Time Value

Some threads may only have output connection, e.g., threads, such as a digitizer, that only generate items for other threads to process. These threads, and others may control garbage collection explicitly by means of the thread's virtual time ($V_t$) 422. When $V_t$ 422 is less than $T^{min}_s$ 421, $V_t$ defines the lower bound of the interval 420.

The thread can control its progress through virtual time by advancing its $V_t$ 422 explicitly using the set-time function described below. By fixing the $V_t$ at an arbitrary time, the thread can prevent the garbage collection process from advancing beyond that point. This can be useful for debugging purposes, or for a system monitor thread.

In summary, a thread can write data items over its output connections (i.e., generate items) having time-stamp coordinates that are members of the set $I_{VTW}$ 410. Threads that read data items from ports usually have no need to explicitly manipulate $V_t$ 422. When a thread is spawned, as shown in FIG. 3, the parent thread can set the initial virtual time $V^0_t$ 426 for the child thread to any value in the parent's virtual time tick window $I_{VTW}$ 410, thereby establishing the initial lower bound, e.g., $V^0_t$ 426, for the virtual time window of the child thread.

Global Virtual Time

Garbage collection is based on a current value of a Global Virtual Time (GVT) 424. The determination of the value of GVT 424 is based on which data items have been marked as consumed, and on the values of thread virtual times $V_t$ 422. The GVT 424 is the smallest of the following: (a) the time stamp value of any data item in a port which has not yet been marked as consumed with respect to one or more input connections to that port; or (b) the virtual time $V_t$ of any thread.

All data items in any ports with time-stamps less than the current global virtual time, e.g., ts<GVT, can be garbage collected. It is possible for a thread to hold up garbage collection by not advancing its $V_t$ 422, or by not consuming items.

Synchronization of Thread Processing with Real Time

The concept of virtual time also plays a useful role in synchronizing the progress of a thread with real-time (RT) 430. The intervals 431 of real time can be, for example, 30 ms. As mentioned above, a thread may need to keep its computation rate in synchrony with real time. The advance of $V_t$ 422 is indicative of the computation rate of the thread. A function of the application programming interface (API), described below, allows the thread to relate its virtual time, e.g., $V_t$, with the passage of real time as follows.

A child thread starts execution at some starting virtual time set by its parent thread. A "base" real time (base_RT) 430 is synchronized to a real time clock when the thread is started. The basis for the thread's virtual to real time correspondence is set via two per-thread variables: base_V, 432 (set to $V^0_t$ at the time the thread is started by its parent), and base_RT 430 (set to the real time at thread start-up). The thread can also locally specify the relationship between a virtual time tick, e.g., increments of the time-stamps, and the interval 431 using the init function of the API.

The STM 200 can suspend the execution of a thread until the following condition is met:

current real-time=((current $V_t$–base_$V_t$)*interval+base_$rt$).

If the current RT 480 exceeds the right-hand side, i.e., the synchrony requirement is not met, then the system allows for user-defined action to be taken to inform other threads, and re-establish a new correspondence between virtual time 422 and the real time for this thread, e.g., the base_$V_t$ 432 is set to the current $V_t$ 422, and base_RT 430 is set to current the RT 480.

Note, the intent of providing real time correlation is purely for achieving "loose" temporal synchrony among the threads. This has no bearing on the correctness of the time-stamp values established through the virtual time model and the GVT mechanisms, described above.

It is important to note that synchrony with real time does not assume the existence of a global clock. Synchrony can be maintained as long as the clocks of the different processors "tick" substantially at the same rate. Such a condition can easily be satisfied with quartz crystal clocks used in most modern processors.

Because the intent is to provide only a loose temporal synchrony, it is sufficient to synchronize with the local real time clock, since clock drift, absolute as well as mutual, is extremely low,commonly used for virtual commonly used for virtual time to real time correspondence. Such an interval for typically application threads is on the order of several milliseconds.

Application Programming Interface for Space-Time Memory

Figure 5:
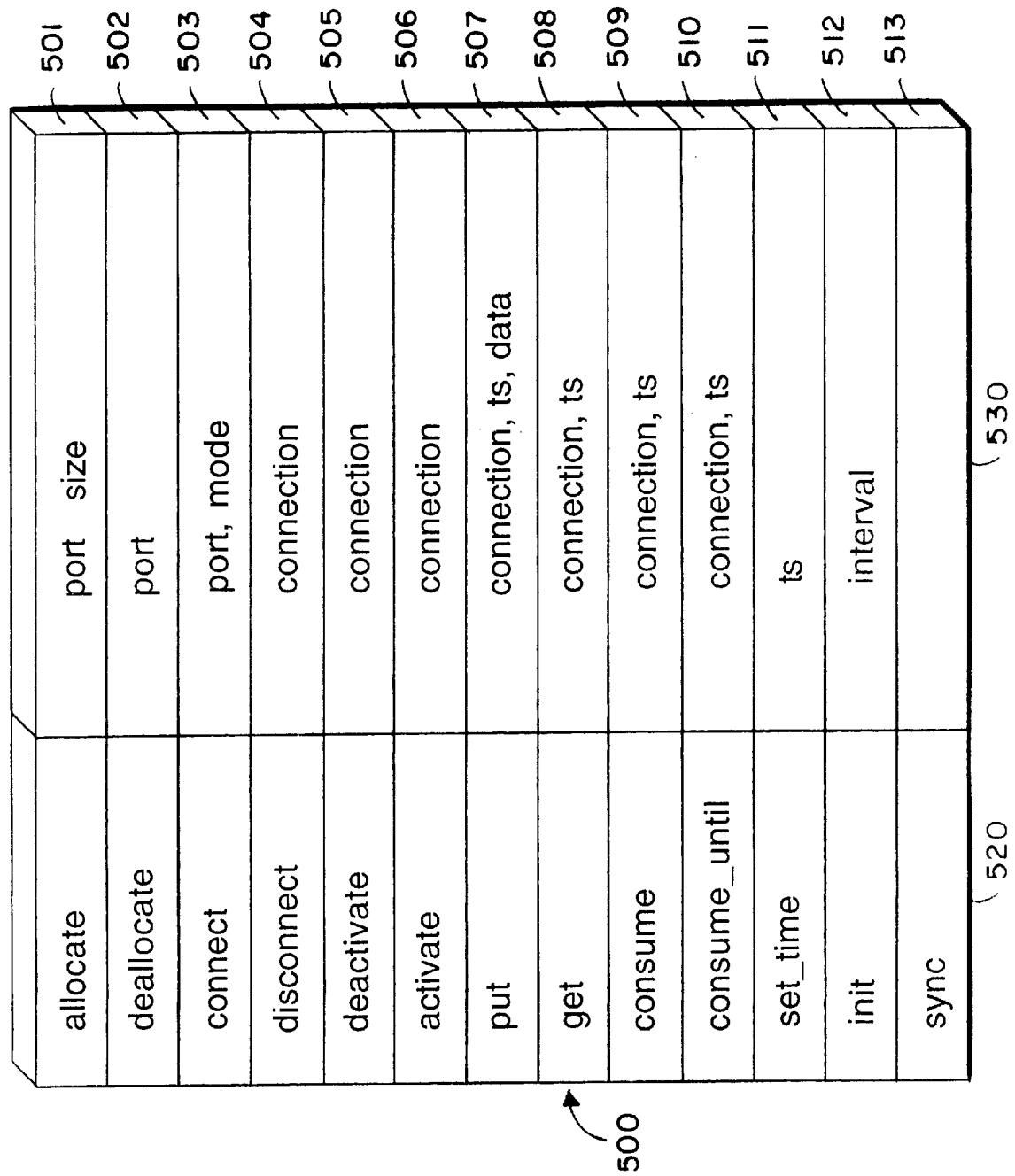
FIG. 5 is a table of thread application program interfaces.

As shown in the table 500 of FIG. 5, application threads access the space-time memory using an application programming interface (API). The API 500 can be implemented as a library of C data structures and function calls linked to the application code.

The API 500 allows applications to manipulate the entities that comprise the memory architecture as detailed herein: threads, ports, connections, items, time-stamps, thread virtual time, and thread virtual time window. The functions are named in column 520, and the calling syntax (parameters) for the API functions are given in column 530. In effect, the API 500 establishes a contract between the calling thread and the STM 200 regarding allowed usage. By following the contract, correctness of the computation is achieved, and the performance potential of the application can be realized.

| Term | Contract Condition |
| --- | --- |
| Reading | The STM ensures that a thread can read all "visible" items on its input connections; |
| Consuming | A thread agrees to consume all of the items on its input connections and advance its virtual time; and |
| Writing | A thread is allowed to place items on its output connections with any time-stamp in its virtual time window. |

This abstraction provides a temporal programming model that is well-suited to the class of parallel processing problems with time constraints. Such a model can achieve three goals:

the programmer is freed from considering the details of synchronization and memory management;

the model can be implemented efficiently once and made available to a variety of interactive processing tasks; and the portability of the application across a variety of parallel architectures is enabled.

The functions of the API 500 are now described in turn.
Allocation and Deallocation A port is allocated by the allocate function 501. The parameters of this function (port, size) identify a port, and an optional size parameter of the port. The size parameter indicates the number of bytes that can be stored in the port. If the size is not specified, then the size of the port is limited by system constraints. The deallocate function 502 expunges the identified port.
Connect and Disconnect A calling application thread gains access to a port by means of a connect function 503. The parameters (port, mode) identify the port and thread to be connected to each other. The mode indicates if the connection is for read-only, or write-only, or read-write access. When the connection has been established, a thread can perform operations on time-stamped data items. The disconnect function 504 separates the thread from the port on that connection. It should be noted, that the thread can continue to access the port via another connection.

It is important to note that there can be multiple consumers for a given port, each with a separate connection. For example, multiple threads may want to process data items produced by another thread. By the same token, there can be multiple producers for the same port, again with separate connections. Note, data items may arrive at a port in any time-stamp order.

Note also, there is no requirement to specify the set of connections for a port prior to run-time.
Deactivate and Activate A calling thread can stop using a connection with the deactivate function 505. This function indicates that the thread is temporarily uninterested in new items appearing on the deactivated connection. Semantically, the function is somewhat similar to the disconnect function, however, the state of the deactivated connection is preserved. This function allows the STM to ignore the state of the connection with respect to the deactivating thread for the purpose of garbage collection. The activate function 506 restores the state of the connection so that the thread can continue to access the port.
Put and Get The put function 507 allows the calling thread to copy an item to the STM at the specified time-stamp location. The port is specified implicitly by the connection. The get function 508 returns the size, content, and time-stamp of a specified data item to the calling thread.

Note, in the case of the get function, the specified time-stamp can take on certain distinguished values. For example, one distinguished value allows a thread to retrieve the data item with the highest time-stamp from a port. Restrictions on the value of the time-stamp are discussed below.
Consume and Consume_Until The STM 200 provides garbage collection which enables the conceptual model of infinite time. To this end, a thread can mark a data item that it has read, used, or does note care about as "consumed" with the consume function 509. This is an indication to the STM 200 that the memory space occupied by the consumed item may be garbage collected as far as this thread is concerned.

Alternatively, a thread can use the consume_until function 510 to mark as consumed all items up to the specified time-stamp on the specified connection. This function has the added implication that future items arriving on the connection will also be marked as consumed when their time-stamps are less than the time-stamp specified in the function call.

The inner loop for many threads will follow a basic usage model in which data are read, processed, and consumed. No other information is necessary to handle garbage collection for these threads.

Set_time

The set_time function 511 is used to set the current virtual time ($V_r$) of the calling thread. The time is specified as an input parameter to the function.

Init

The init function 512 is used to specify the relationship between a virtual and real time using the interval parameter 431 of FIG. 3.

Sync

The sync function 513 is used to synchronize the current virtual time with real time using the relationship specified by the init function 512.

STM in Software Applications

The STM framework of threads, ports, and connections makes developing interactive parallel processing software applications easier and more intuitive. In particular, the application designer never has to use the low-level synchronization mechanisms such as locks and barriers; nor does the designer have to explicitly manage storage buffers. The STM abstraction implicitly combines synchronization with data transfer, and transparently handles garbage collection of items which are guaranteed not to be referenced by the threads.

In one embodiment, the STM is implemented on a Digital Equipment Corporation AlphServer 4100 Symmetric Multi-Processor running the Digital Unix (tm) operating system. In another embodiment, the STM is implemented on a cluster of SMPs interconnected by the Memory Channel cluster interconnect, also from Digital. In another embodiment, the STM is implemented on an Intel SMP running the Microsoft NT operating system. In another embodiment, the STM is implemented on a collection of UNIX workstations interconnected by a standard Ethernet network. As an advantage, the application programs that use the STM as described herein can be migrated from a single SMP to a cluster without any change to the application code because the API for the STM remains unchanged.

Automated Vision System

Figure 6:
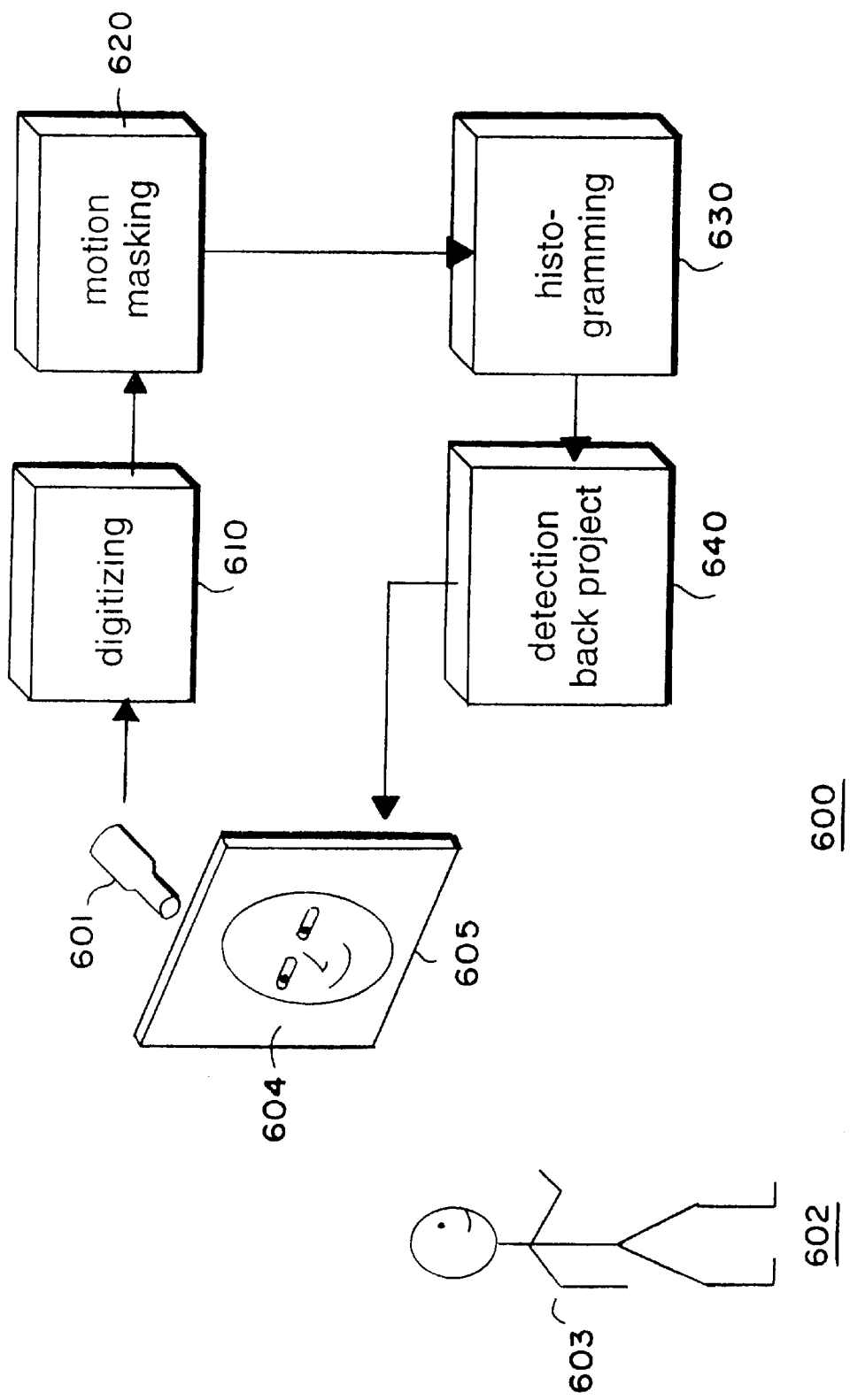
FIG. 6 is a top-level block diagram of a vision system which can use the space-time memory of the invention.

As shown in FIG. 6, a specific use of the STM is now described with respect to a multi-threaded implementation of a color-based tracking application 600. In the application 600, a camera 601 observes a scene 602 including one or more persons 603. The scene is measured as a temporally ordered sequence of frames, e.g., a video stream. The frames are generated at a predetermined rate. For example, a frame is generated every 30 ms. Each frame includes a regular pattern of pixels where the pixel values express color and light intensities of the scene 602.

The color tracking application 600 can be logically divided into four threads: digitizing 610, motion masking 620, histogramming 630, and detection/backproject 640. In a real-time application such as this example vision system, all downstream processing (620, 630, and 640) of the frames must progress at substantially the same rate as frames are produced, otherwise, synchronization between the input data and output control signals cannot be maintained.

The purpose of the system 600 is to track the person 603 in the scene 602, and to generate a display 604 on an output device 605. The display can be, for example, a talking face (or some other synthetic agent) whose gaze "tracks" the moving person.

In a conventional implementation of a vision system, frame buffers are typically explicitly managed. Such systems can be error-prone, and difficult to optimize for best performance. Buffer management strategy must respect the temporal evolution of the data that are processed by the threads. Threads must be synchronized to the arrival of new data items, and only overwrite stale data. There, the performance of vision tasks is critically dependent on how well buffer management and synchronization are carried out.

Figure 8:
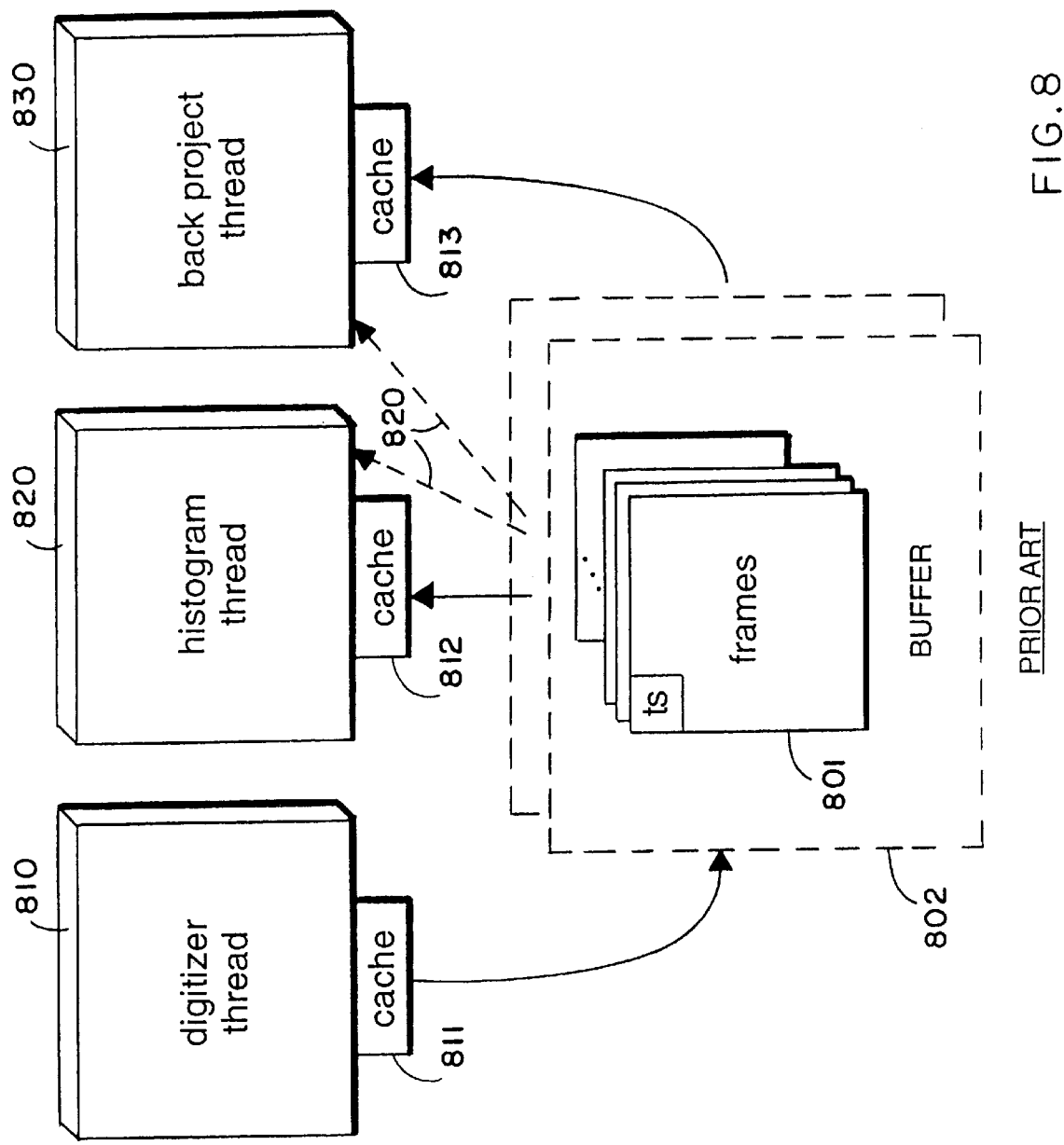
FIG. 8 is a block diagram of threads buffering frames.

In general, the two sources of overhead affect the performance of parallel programs: synchronization and communication. These two overheads are illustrated in FIG. 8 for a conventionally implemented color-tracking application.

Digitizer thread 810 stores image frames 801 as data items in one or more buffers 802. The data items are read by the downstream, execution wise, histogram thread 820, and a backproject thread 830. Each thread 810, 820, and 830 can use caches 811–813 to take advantage of spatial and temporal localities characteristic of the data items.

In order to write a frame, the digitizer thread 810 allocates one or more buffers, 802, writes pixel data to the buffer(s), and synchronizes with the downstream threads 820 and 830 to make them aware of new data. The downstream threads, in turn, must synchronize with the digitizer 810 so that physical memory for the buffers can be reused. Synchronization operations are a significant source of performance overhead and a potential source of programming error.

The second source of overhead, which may not be obvious to a naive designer, is the amount of data traffic generated by the underlying hardware in order to maintain the consistency of the data items in the caches 811–813. Therefore, as the digitizer writes to the frame buffers 802, corresponding memory locations in the downstream caches 812–813 are invalidated to produce message traffic shown by the dashed lines 820.

Although the details in this example application will vary with different hardware designs and cache coherence protocols, the important point to state is that there are overheads in an SMP architecture that can potentially penalize a naive implementation severely.

The characteristic data flow in interactive vision applications suggests two avenues for optimizing performance. First, the rate at which data items enter the system, e.g., a rate of 33.3 Hz in the case of the digitizer thread 810, dictates the maximum processing rate for the downstream threads. This rate provides clues as to the frequency of access to buffered data items by the threads.

Second, the topology of the data flow encodes the data dependencies in the system. These dependencies may be exploited to hide communication latency, for example, by prefetching data required by downstream threads. Optimizations of this kind will be particularly important in a clustered implementation as described above where hardware support for shared memory may not available to the SMPs.

Vision System with STM

Figure 7:
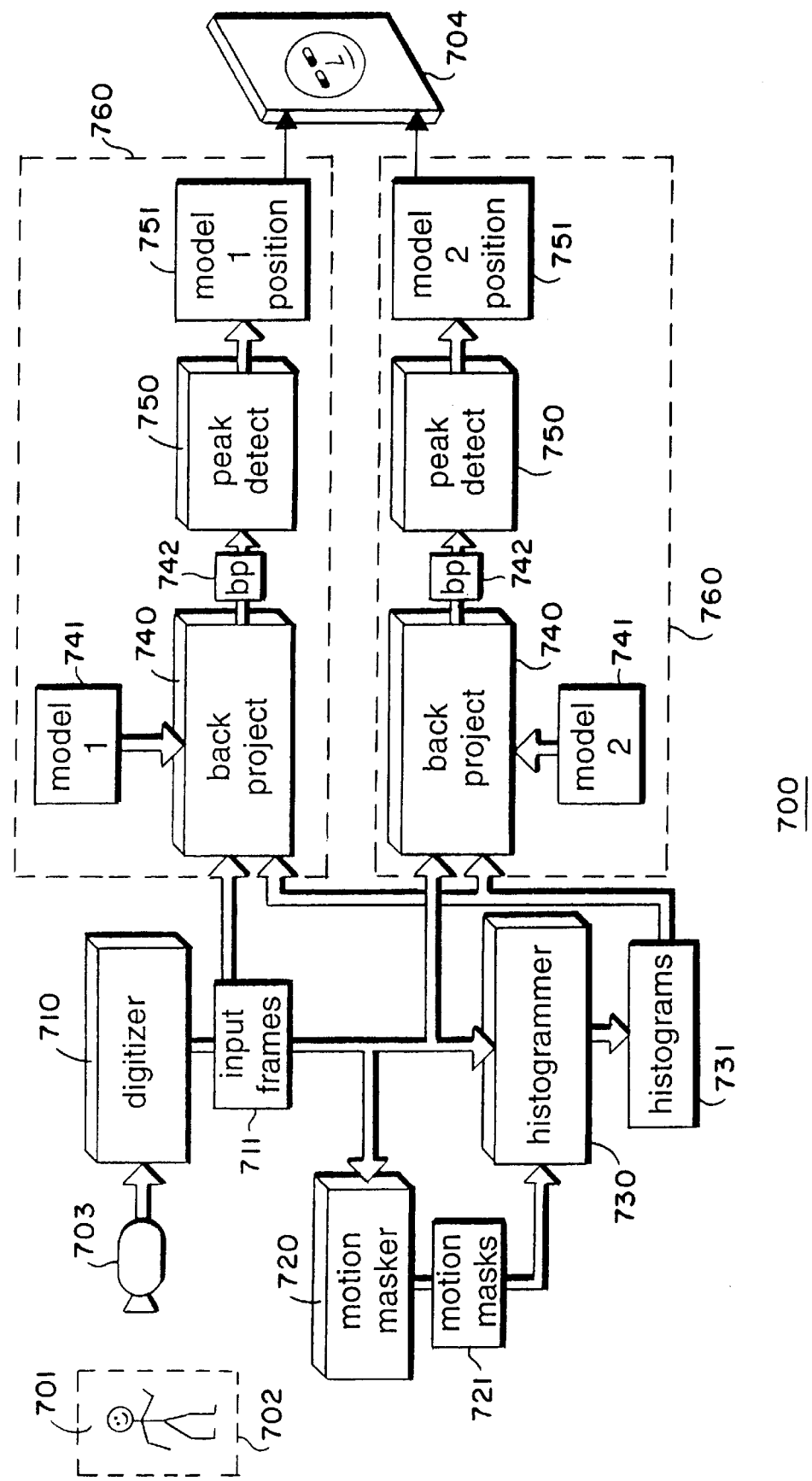
FIG. 7 is a detailed data flow diagram of the system of FIG. 6.

FIG. 7 shows an automated vision system using a four port space-time memory. The ports store input images, motion masks, image histograms, and tracker output. Tracker output includes both the backprojection image which is useful for debugging purposes, and the current position of detected objects (persons). Here, a color indexing algorithm is applied to the problem of tracking people 701 in a scene 702 using a camera 703. The tracking is based the color of the persons' clothing. In this implementation, the estimated position of the person(s) 701 in the scene 702 drives the gaze behavior of a graphical agent 704.

Data flow originates at the digitizer thread 710. The digitizer 710 acquires input color frames 711 (port 1) at a rate of 33.3 Hz. Each incoming frame 711 is subtracted from the preceding frame, and is thresholded using a motion masker thread 720 to produce binary motion masks 721 (port 2) identifying moving regions in the scene 702, presumably people 701.

Each pixel of each frame selected by the motion masker is binned into a color histogram 731 (port 3) by the histogrammer thread 730. Each moving object to be tracked is represented by a histogram of the same size. The back projection threads 740 intersect the image histogram 731 with deduced models 741 to indicate whether the modeled object is present in the scene 702.

Assuming the modeled moving object is present, backprojection images (bp) 742 are formed. The largest peak in the backprojection images, as determined by peak detection threads 750 give the approximate positions 751 (port 4). Knowing the positions of the moving object, the posture of the graphical agent 704 can appropriately be formed.

Although the sample implementation only shows, for example, the tracking of two moving objects, it should be understood that any number of moving objects can be tracked by replicating the components enclosed by the dashed lines 760.

Now, an implementation of the tracking process using the STM is described. Each of the processing operations, for example, digitizing 710, motion masking 720, and histogramming 730 can be assigned to a separate thread. For each color model there can be two additional threads, one for backprojection 740, and one for peak detection 750.

Note that thread management as described with reference to FIG. 3 can be used to spawn and terminate threads as required by the appearance and disappearance of persons 701 in the scene 702 over time. Two additional threads not indicated in FIG. 7 can read the estimated positions of the modeled objects to produce graphical output and provide control of the system through a graphical user interface (GUI).

The data items that each thread produces are buffered in STM ports. In this example, there would be ports for the input images 711, motion masks 721, image histograms 731, models positions 751.

Included below is annotated pseudo-code for two of the four threads: digitizing and backprojection. The other threads have a similar form. The function calls to the STM API are reproduced in some detail to provide examples of typical argument values. However, the nonessential arguments have been omitted in the interest of clarity. Function calls that cause synchronization to occur are indicated in boldface format.

Digitizer Pseudo-Code
1 stm_thread_init( )
2 stm_tg_init(digitizer_code,33.3) ; VT ticks correspond to 33.3 ms
3 port index ⇐ stm_attach_output_port(digitizer_port)
4 frame_count ⇐ 0; Counter for current frame
5 repeat until kill signal caught
6 frame_buffer ⇐ new frame
7 stm_port_put_item(port_index, frame_count, frame_buffer)
8 frame_count ⇐ frame_count+1
9 stm_set_virtual_time(frame_count) ; Advance VT
10 sync_vt_with_rt0; Synchronize with rt The port_index variable initialized in line 3 identifies the connection between the thread and the digitizer port. In this example, the contents of the data items stored in the port are, for efficiency, pointers to the digitized frames, not the actual pixel data. The STM ensures that the referenced contents are visible to any thread that reads the port.

The digitizer thread 710 associates a time-stamp value for each data item that it produces in line 7 by means of the frame count variable it maintains in line 8. Here, in contrast to a conventionally implemented system, buffer management is implicit in the stm_port_put item call. This call will block the digitizer thread when there is no space available in the port to put the item. Eventually, after down stream threads have marked items as consumed on the port, space will become available and the digitizer thread will be unblocked.

Backproject Pseudo-Code
1 stm_thread_init( )
2 image_port_index ⇐ stm_attach_input_port (digitizer_port)
3 histo_port_index ⇐ stm_attach_input_port (histogram_port)
4 output_port_index ⇐ stm_attach_output_port (tracker_port)
5 model_histo ⇐ Initialize color histogram model for target
6 Repeat until kill signal caught
7 {image_histo, time_stamp} ⇐ stm_port_get_item (histo_port_index, LATEST)
9 {image, time_stamp} ⇐ stm_port_get_item (image_port_index, time_stamp)
10 do if=Intersect(image_histo, model_histo)=TRUE
11 then {x, y, bp_image} ⇐ Backproject(image, image_histo, model_histo)
12 record ⇐ Detected model state
13 stm_port_put item(output_port_index, time_stamp, record)
   stm_port_consume_items_until(histo_port_index, time_stamp)
14 stm_port_consume_items_until(image_port_index, time_stamp)

The pseudo-code for the digitizer thread is similar to the pseudo-code of the backproject thread except that the latter shows both reading and writing using multiple connections to the ports of the STM. The argument LATEST in line 7 ensures that the most recent unread image histogram will be returned, along with its associated time-stamp. This time-stamp is then used in lines 9 and 13 to retrieve the corresponding image and write out the result of object detection.

The calls in lines 7 and 9 will block processing until the requested data are available. The record variable in line 12 holds the x, y position of the model along with the back projection image, and a flag to indicate whether or not the model was found.

The digitizer and backproject pseudo-code illustrate some basic uses of the STM for vision applications, along with the relevant function calls from the API. The most important observation is that the two most common chores in shared memory programming, synchronization and buffer management, are not explicitly present in the user-level code. These chores are handled implicitly by the STM, using the information the programmer communicates through the API.

Summary

Portability is one of the key benefits of the software controlled shared memory structure as described herein.

Applications which use the STM as described here can run on any multi-processor machine that supports the model, regardless of its underlying memory and communication architecture. The preferred embodiment of the STM is implemented as a C library, and does not rely on any special features of a multi-processor architecture. This greatly simplifies the task of adapting applications to new MIMD architectures or new generations of multi-processor computers.

More specifically, with respect to a complex application such as interactive vision, the STM provides a means for managing temporally ordered data items such as frames in a video sequence. In fact, most synchronization between independent threads stems from the need to ensure that: frame buffers are not reused prematurely on the producer side; and availability of buffered data items is not assumed prematurely on the consumer side.

The space-time memory structure embodies this management of temporally ordered buffers. It defines a shared space-time memory that can be accessed by application programs through a common API.

It is understood that the above-described embodiments are simply illustrative of the principles of the invention. Various other modifications and changes may be made by those skilled in the art which will embody the principles of the invention and fall within the spirit and scope thereof.

What is claimed is:

1. A computerized method for accessing shared data stored in a memory, comprising:

allocating the memory to a plurality of ports arranged in a spatial ordering;

temporally ordering a plurality of data items in each of the plurality of ports, each data item including a time-stamp value to indicate the temporal ordering of the plurality of data items; and accessing the plurality of data items by a plurality of threads using space and time coordinates, the space and time coordinates uniquely identifying each of the plurality of data items.

2. The method of claim 1 wherein the plurality of data items have different data sizes.

3. The method of claim 1 wherein each access associated with a particular thread is an atomic access.

4. The method of claim 1 further including the step of the disconnecting a particular port.

5. The method of claim 1 wherein a particular thread has an associated virtual time window, the virtual time window defining a range of time-stamp values that are associated with data items generated by the particular thread.

6. The method of claim 1 wherein a particular thread has a virtual time.

7. The method of claim 6 further including the step of determining a global virtual time using the virtual times of the plurality of threads and the time stamp values of unconsumed data items in the plurality of ports.

8. The method of claim 7 further including the step of garbage collecting data items having time-stamp values less than the global virtual time.

9. The method of claim 6 further including the step of synchronizing the virtual time of the particular thread with the real time.

10. The method of claim 9 further including the step of specifying a relationship between a virtual time tick and an interval of real time.

11. The method of claim 10 further including the step of suspending execution of the particular thread until the virtual time of the particular thread is substantially equal to the real time with respect to the relationship between the virtual time and the real time.

12. The method of claim 1 further including the step of connecting a particular port to a particular thread to enable the particular thread to access data items in the particular port.

13. The method of claim 1 wherein a subset of the data items are digitized frames of a video stream.

14. The method of claim 1 further including the step of garbage collecting a particular data item when the particular data item has been marked as consumed a predetermined number of times.

15. The method of claim 1 wherein the plurality of data items are generated in any temporal ordering.

16. The method of claim 12 wherein the particular port and the particular thread have multiple connections.

* * * * *